Jan. 5, 1954    J. W. DEVORSS, JR    2,664,673
DIAPHRAGM MOTOR
Filed Nov. 20, 1946

INVENTOR.
JOSEPH W. DEVORSS, Jr
BY William N. Epes
ATTORNEY

Patented Jan. 5, 1954

2,664,673

UNITED STATES PATENT OFFICE 2,664,673

DIAPHRAGM MOTOR

Joseph W. Devorss, Jr., Scarsdale, N. Y., assignor to United States Rubber Company, New York, N. Y., a corporation of New Jersey Application November 20, 1946, Serial No. 710,971

5 Claims. (Cl. 50—10)

1

This invention relates to a fluid pressure motor to provide with a diaphragm piston including a rubber spring diaphragm for actuating said piston upon a decrease in the fluid pressure on the diaphragm. The invention also includes the use of such a motor in a regulating apparatus for controlling a characteristic of a substance, and where the substance is a fluid, the characteristic to be controlled may be temperature, pressure, or rate of flow.

Heretofore fluid pressure motors used in control apparatus have been provided with flexible diaphragm pistons which were actuated in the outward direction against the resistance of coiled steel springs upon an increase in pressure on the diaphragm and in the opposite direction by the energy stored in the springs upon a decrease in fluid pressure on the piston, such fluid pressure being responsive to a characteristic of the substance to be controlled.

My rubber spring diaphragm piston motor has a number of advantages over the steel spring actuated motor, among them are: (a) the coiled steel spring being eliminated, the over-all height of the motor is reduced, (b) fewer parts are required with the resulting reduction in cost of assembly, (c) variation in the characteristic of the medium to be controlled is reduced due to the lack of critical frequency of vibration in rubber which is inherent in coiled steel springs and which is exhibited by vibrations passing from one convolution of the spring to another, and (d) the rubber spring diaphragm acts as a positive guide for the piston rod and thereby eliminates some of the friction in the rod bearings, a cause of irregularity or lag in the operation of the motor.

Such advantageous characteristics of a motor in a regulating apparatus results in quick and uniform response to changes in the characteristic of the substance or medium to be controlled, and thereby accurately controls the characteristic.

Figure 1:
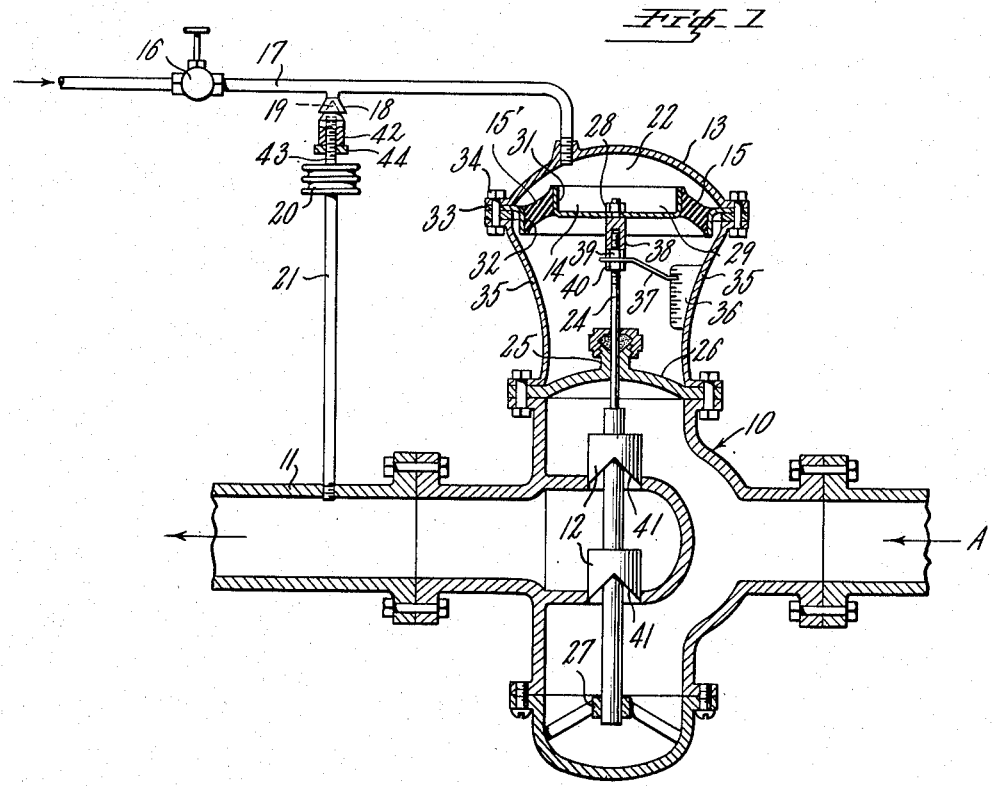
Figure 2:
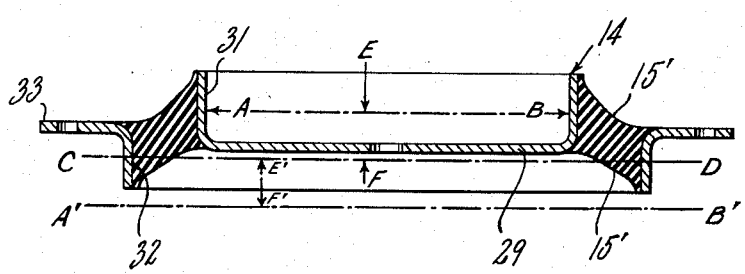

The foregoing and other objects of this invention will be more clearly understood by referring to the following description and the accompanying drawings in which:

Fig. 1 is a cross sectional view of a regulating apparatus, including the fluid pressure motor embodying this invention, showing the fully retracted position of the diaphragm piston; and Fig. 2 is an enlarged cross sectional view of the rubber-metal diaphragm piston supported in its unrestrained or completely retracted or molded position;

2

Referring to Fig. 1, the regulating apparatus comprises a valve 10 connected to a source of fluid supply which flows to the valve in the direction indicated by the arrow A and thence through the valve 10 to a delivery pipe 11, in which the pressure or the flow therein is regulated or controlled by the balanced valve pistons 12, which are operated by a fluid pressure motor 13, in response to the pressure in the delivery pipe 11. The valve pistons 12 are attached to the motor diaphragm piston 14 which is actuated in one direction by fluid pressure varied in response to the pressure in pipe 11 and in the opposite direction by a rubber spring 15 upon a decrease of such pressure.

The responsive action is produced by air supplied to the motor 13 through a supply line having a controlled restriction 16 therein, which may be in the form of a throttle valve. A predetermined uniform pressure is maintained in the inlet to the restriction 16, and when the air flows, a drop in pressure occurs between the inlet and the outlet 17 which leads to the motor 13. The motor operating pressure in the outlet 17 is therefore caused to respond to the pressure in the pipe 11 by means of an air escape nozzle 18, the flow through which is controlled by a closure 19 operated by the pressure in the delivery pipe 11, through a Sylphon 20 connected by a pipe 21 to the delivery pipe 11.

The motor 13 comprises a fluid pressure chamber 22 which is closed on one side by the diaphragm piston 14, to which is connected a rod 24, which operates the valve pistons 12. The rod 24 is guided by the gland bearing 25 where it passes through the supply valve casing 26 and the bearing 27 on the opposite side of the valves 12. The connection 28 between the rod 24 and the piston 14 moves in line with the bearings 25 and 27 and also guides the rod 24, but without friction.

The diaphragm piston 14 comprises an inner central rigid disc-like member 29 and the resilient elastic rubber spring ring 15. The inner member 29 is provided with an annular outer flange 31. The rubber ring 15 is bonded to the flange 31 and to an inner flange 32 on a diaphragm supporting plate 33, which is bolted in sealed relation to the shell of the fluid pressure chamber 22 by bolts 34. The fluid pressure chamber 22 is supported on the valve casing 26 by arms 35, which are bolted to the shell of the chamber 22 and the casing 26. One of the arms 35 is provided with a stationary scale 36 with which a pointer 37 on the rod 24 cooperates to indicate the position of the valve piston 12 in respect to the cut off point. The usual adjustment of the valve rod 24 is provided by screwing it into the socket 38 and locking it in place with the lock nut 39. The pointer is clamped between lock nuts 39 and 40.

An enlarged cross sectional view of the diaphragm piston 14 with its surrounding supporting ring plate 33 is shown in Fig. 2. The rubber spring ring 15 is molded in a frustro conical shape between the flanges 31 and 32 on the inner member 29 and outer plate 33, respectively, in the position shown in Fig. 2, and in the process the rubber is securely bonded in fluid tight sealed relation to the flanges. As molded the flange 31 is axially offset from the flange 32 and when the diaphragm 14 is assembled in the motor 13, the inner flange 31 projects further into the pressure chamber 22 than the flange 32, there being atmospheric pressure in the chamber. As shown in Fig. 1, the flange 31 is at its extreme inner operating position and the valve 10 is fully opened, as determined by the extreme upward position of the valve pistons 12. Upon an increase in pressure in the motor chamber 22, the inner diaphragm member 29 moves downwardly and subjects the body of the rubber 15 to shear stresses and its exposed surfaces 15' to compression stresses. Such movements should not be continued until the compression stresses in the rubber become tension stresses since it has been found that fatigue of the rubber section occurs at a rate which renders the unit impractical when the exposed surfaces of the rubber are stressed in tension.

The practical range of the movement of the diaphragm piston 14 is illustrated in Fig. 2, wherein the dot and dash lines A—B and C—D respectively, represent the central diametrical planes of the inner periphery of the rubber ring 15 adhered to the flange 31, and of the outer periphery of the rubber ring 15 adhered to the flange 32, and the dot and dash line A'—B' represent the end of the movement of the central plane A—B on the outward movement of the piston 14, a distance E'—F' below the central plane C—D, equal to the distance E—F of A—B above the central plane C—D. Therefore the maximum operating travel of the inner member 29 is twice the molded offset distance E—F. It is desirable, however, to limit such travel slightly in order to insure the retention of compression stresses in the rubber surfaces 15' at all times during the operation of the regulator.

In the operation of the apparatus, a pressure in the air supply line 14 is selected which will operate the fluid pressure motor 13 with the desired degree of sensitivity when the nozzle 18 is closed, and the restriction 16 is adjusted to permit the required flow of air to attain such sensitivity. The piston valves 12 are provided with notches 41 through which fluid is adapted to flow from the source A to the delivery or outlet pipe 11. The more elevated the valve pistons 12 are positioned, the greater the flow, and the motor 13 is adapted to so position the valve as to increase or decrease the flow to maintain a constant pressure in the delivery pipe 11. Having selected a delivery pressure, the opening of the nozzle 18 in the air line 17 to motor 13 is adjusted by means of the adjustment 42, which consists of turning the valve 19 on the threaded rod 43 and locking it in place with the locking nut 44. The opening of the nozzle 18 is adjusted for a normal flow through the delivery pipe 11 so that the diaphragm piston 14 of the motor 13 will be moved downwardly against the spring action of the rubber spring ring 15 to a point where the valve pistons 12 will be positioned to maintain such flow. During average or normal flow the central diametrical planes A—B and C—D of the flanges 31 and 32, respectively, should coincide. If the pressure in the delivery pipe 11 should fall, the corresponding reduction in the pressure in the Sylphon 20 occurs, and permits the valve 19 to increase the opening in the nozzle 18, and thereby reduce the pressure in the air delivery line 17 to the motor 13. The reduction of the pressure in the motor pressure chamber 22 follows the reduction of pressure in the air supply line 17 thereto, and permits the rubber spring ring 15 to elevate the valve pistons 12 and increase the flow of fluid to the delivery line 11, and thereby increase the pressure therein, which in turn will affect the positioning of the valve 19 so that the escape of air through the nozzle 18 will be controlled to maintain the pressure in the chamber 22 at the desired point to maintain the valves 12 in the position required to permit the flow to maintain the predetermined selected pressure in the delivery line 11. In other words any change in pressure in the delivery line 11 affects a change of operating air pressure in the fluid pressure motor chamber 22 through the action of the Sylphon 20, which responds to the pressure in the delivery line 11, and changes the position of the piston valves 12 to affect an increase or decrease in the flow of fluid from the supply A to increase or decrease the pressure in the delivery line 11 as may be required.

While the preferred form of this invention has been described herein, it will be understood that changes in details thereof may be made without departing from the spirit of this invention, or the scope of the appended claims.

Having thus described my invention, what I claim and desire to protect by Letters Patent is:

1. A fluid pressure motor comprising a casing having a fluid pressure chamber therein, means for sealing one side of said chamber comprising an outer ring secured with a fluid tight joint to said chamber and having an inner annular flange thereon, an inner disc having an outer annular flange thereon, a relatively thick rubber ring interposed between and bonded to said flanges, said inner disc and rubber ring forming a piston, said flange on said inner disc being offset axially inwardly of said chamber from said flange on said outer ring and the faces of said rubber ring being generally frustro conical and converging axially inwardly of said chamber when the pressure on opposite sides of said ring is balanced, means for actuating said piston outwardly by increasing the pressure in said chamber while combined compressive and shear stresses are imparted to said rubber ring, and said piston being actuated in the opposite direction by the resilient energy stored in said rubber ring upon the decrease of pressure in said chamber.

2. A fluid pressure regulator motor comprising a casing forming a fluid pressure chamber, a diaphragm piston closing said chamber and connected to a member to be controlled, said piston comprising a frustro conical rubber ring having inner and outer cylindrical peripheries concentric to the conical axis of said ring, said peripheries having a substantial axial length, an inner plate having an outer cylindrical periphery co-extensive with said inner periphery of said rubber ring, a support for said outer periphery of said rubber ring, said support having an inner cylindrical periphery co-extensive with said outer periphery of said rubber ring, said inner periphery of said rubber ring being bonded to said outer periphery of said plate and said outer periphery of said rubber ring being bonded to said inner periphery of said support, said rubber ring having the small end of its conical shape projecting towards said chamber, and said rubber ring being constructed and arranged to be subjected to shearing stresses by the movement of said piston outwardly from said pressure chamber.

3. A fluid pressure regulator motor comprising a wall forming one side of a fluid pressure chamber, a diaphragm piston movable in respect to said wall and cooperating therewith to form the opposite side of said chamber, said piston having its entire pressure area spaced from said wall at its nearest approach thereto, said piston comprising an inner rigid member and a relatively thick ring of rubber bonded at its inner and outer peripheries respectively to said inner member and the surrounding wall of said chamber, said rubber portion of said piston having a frusto conical shape as initially formed and having its apex directed towards the interior of said chamber as installed, means for actuating said piston outwardly of said chamber by increasing the pressure therein, and said piston being actuated in the opposite direction by energy stored in said ring of rubber.

4. In a regulating apparatus, a fluid pressure motor and a control operated thereby for controlling at least one of the temperature, pressure, and rate of flow characteristics of a medium, said motor comprising a rigid wall forming one side of a fluid pressure chamber, a diaphragm piston movable in respect to said wall and cooperating therewith to form the opposite side of said chamber, said piston having its entire pressure area spaced from said wall at its nearest approach thereto, said piston being connected to said control and comprising a rigid member surrounded by a ring of resilient rubber bonded to said rigid member and to a member secured to said rigid wall of said chamber, said ring of rubber being of frusto conical shape when not stressed and having its smaller end projecting into said chamber, means for increasing the pressure in said chamber in response to a change in one of said characteristics and thereby actuates said piston and said control to compensate for the change in such characteristic, and means for decreasing the pressure in said chamber in response to an opposite change in such characteristic to permit said rubber ring to operate said piston and control in the opposite direction to counteract said last change in such characteristic.

5. In a regulating apparatus, a fluid pressure motor and a control operated thereby for controlling at least one of the temperature, pressure, and rate of flow characteristics of a medium, said motor comprising a rigid wall forming one side of a fluid pressure chamber, a diaphragm piston movable in respect to said wall and cooperating therewith to form the opposite side of said chamber, said piston having its entire pressure area spaced from said wall at its nearest approach thereto, said piston being connected to said control and comprising an inner rigid member and a relatively thick ring of rubber bonded at its inner and outer peripheries, respectively, to said inner member and the surrounding rigid wall of said chamber, said rubber ring being substantially unstressed and its inner periphery being offset axially from its outer periphery inwardly of said chamber when said chamber is under atmospheric pressure, means for increasing the pressure in said chamber in response to a change in one of the characteristics and thereby actuate said piston and said control to compensate for the change in such characteristic, and means for decreasing the pressure in said chamber in response to an opposite change in such characteristic to permit said rubber ring to operate said piston and control in the opposite direction to counteract said last change in such characteristic.

JOSEPH W. DEVORSS, Jr.

References Cited in the file of this patent

UNITED STATES PATENTS

| Number | Name | Date |
|---|---|---|
| 339,757 | Fulton | Apr. 13, 1886 |
| 975,444 | Lulli | Nov. 15, 1910 |
| 1,840,228 | Elfers | Jan. 5, 1932 |
| 1,849,930 | Ives | Mar. 15, 1932 |
| 1,885,457 | Lord | Nov. 1, 1932 |
| 2,050,736 | Sampson | Aug. 11, 1936 |
| 2,074,698 | Langdon | Mar. 23, 1937 |
| 2,126,707 | Schmidt | Aug. 16, 1938 |
| 2,220,581 | Piron | Nov. 5, 1940 |
| 2,287,992 | Grove | June 30, 1942 |
| 2,352,030 | Sproul | June 20, 1944 |
| 2,354,958 | Loweke | Aug. 1, 1944 |
| 2,365,752 | Edwards | Dec. 26, 1944 |
| 2,368,132 | French | Jan. 30, 1945 |
| 2,455,480 | Hadley | Dec. 7, 1948 |